United States Patent
Forssén et al.

[19]

[11] Patent Number: 5,838,674
[45] Date of Patent: Nov. 17, 1998

[54] CIRCUITRY AND METHOD FOR TIME DIVISION MULTIPLE ACCESS COMMUNICATION SYSTEM

[75] Inventors: Ulf Göran Forssén, Saltsjö-Boo; Carl Fredric Ulf Kronestedt, Stockholm, both of Sweden

[73] Assignee: Telefonaktiebolaget L M Ericsson, Stockholm, Sweden

[21] Appl. No.: 690,568

[22] Filed: Jul. 31, 1996

[51] Int. Cl.[6] .................................................. H04J 3/16
[52] U.S. Cl. ................................. 370/337; 370/347
[58] Field of Search .................................. 370/252, 337, 370/330, 347, 500, 314, 321, 326, 329, 334, 333, 344, 343, 345, 442; 455/524, 403, 422, 445, 13.4, 13.3, 517, 525, 63, 66, 67.3

[56] References Cited

U.S. PATENT DOCUMENTS

| | | | |
|---|---|---|---|
| 5,648,955 | 7/1997 | Jensen et al. | 370/337 |
| 5,652,752 | 7/1997 | Suzuki et al. | 370/337 |

FOREIGN PATENT DOCUMENTS

| | | |
|---|---|---|
| 0 647 979 A3 | 4/1995 | European Pat. Off. . |
| 2 295 524 | 5/1996 | United Kingdom . |
| WO 95/05722 | 2/1995 | WIPO . |
| WO 95/09490 | 4/1995 | WIPO . |

OTHER PUBLICATIONS

Steiner Andresen, Knut Jostein Sævild and Tor E. Wisløff, "Skinfakse Service Integrated Radio System for Road Traffic", IEEE 1992—Vehicle Navigation & Information Systems, pp. 455–460.

Primary Examiner—Dang Ton
Attorney, Agent, or Firm—Jenkins & Gilchrist, P.C.

[57] ABSTRACT

Method and apparatus for increasing the communication capacity of a communication system utilizing a time-division, multiple-access communication scheme. A broadcast carrier is defined which is divided into time slots which include a control channel and traffic channels. The traffic channels are used to communicate traffic signals with remote subscriber units. When the traffic channel is not used to communicate traffic signals, carrier signals, whether modulated with information or not, are instead generated, thereby to ensure that signal energy is detected by a mobile subscriber unit when tuning to the broadcast carrier. Two or more signals can be transmitted concurrently upon a single traffic channel utilizing antenna forming techniques wherein the antenna beam pattern used to transmit the two or more traffic signals together encompass an entire cell.

30 Claims, 4 Drawing Sheets

TDMA COMMUNICATION SCHEME

(CONTROL CHANNEL TS)   (TRAFFIC CHANNEL TSs)

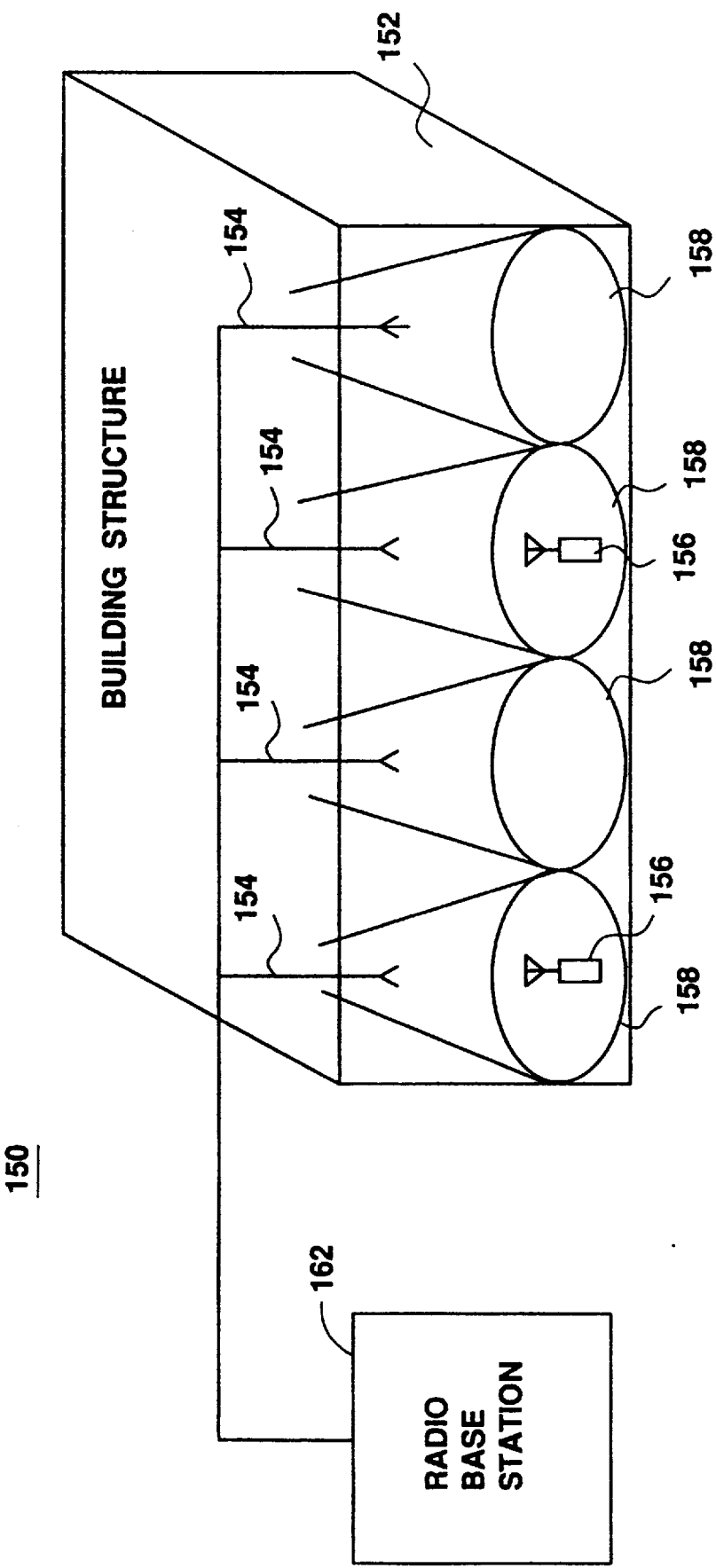

CIRCUITRY AND METHOD FOR TIME DIVISION MULTIPLE ACCESS COMMUNICATION SYSTEM

CROSS-REFERENCE TO RELATED APPLICATIONS

The present invention is related to co-pending patent application Ser. No. 08/540,326 filed on Oct. 6, 1995, entitled "Distributed Indoor Digital Multiple-Access Cellular Telephone System", the contents of which are incorporated by reference herein.

The present invention relates generally to a time division-multiple-access (TDMA), radio communication system. More particularly, the present invention relates to circuitry, and an associated method, for a TDMA transmitter operable in a TDMA communication system which permits at least two separate signals to be transmitted concurrently during a single time slot to at least two separate, spatially-separated receivers. The signals are transmitted upon a carrier which also includes a time slot which forms a control channel.

Concurrent transmission of the separate communication signals during the single time slot increases the communication capacity of the communication system. In an exemplary embodiment, the communication system forms a cellular communication system, such as a Global System for Mobile communications (GSM) system. More than one communication signal can be transmitted concurrently upon a single traffic channel defined upon the same carrier as the carrier upon which a control channel is defined. Separate downlink signals transmitted by a base station of the cellular communication system can be concurrently transmitted to separate, spatially-separated mobile subscriber units located within a cell. Antenna beam patterns of antennas which transduce the downlink signals are selected such that the separate downlink signals are concurrently transmitted to the appropriate mobile subscriber units. The antenna beam patterns together encompass the entire cell. A subscriber unit positioned anywhere within the cell tunes to the carrier to detect signal energy transmitted upon either a traffic channel or the control channel.

Similar such increases in the communication capacity of another TDMA communication system, such as a microcellular communication system or a trunked-communication system, are similarly possible.

BACKGROUND OF THE INVENTION

A communication system is formed, at a minimum, by a transmitter and a receiver interconnected by a communication channel. Communication signals transmitted by the transmitter are transmitted upon the communication channel to be received by the receiver.

A radio communication system is a communication system in which the communication channel is formed of one or more frequency bands of the electromagnetic frequency spectrum. Because a fixed or hard-wired connection is not required to be formed between the transmitter and the receiver, a radio communication system is advantageously utilized when the use of such fixed or hard-wired connections would be inconvenient or impractical.

A cellular communication system is a type of radio communication system. When the infrastructure, hereinafter referred to as the network, of the cellular communication system is installed throughout a geographical area, a subscriber to the cellular system is generally able to communicate telephonically in the system when positioned at any location in the geographical area encompassed by the system.

Technological advancements have contributed to lowered costs of communicating pursuant to a cellular communication system. Concomitant with the decreased costs of communicating pursuant to a cellular communication system has been an increase in usage of such systems. In some instances, conventional cellular communication systems have been operated at their maximum capacities. When operated at their maximum capacities, access is sometimes denied to additional users attempting to communicate pursuant to such systems. Ongoing calls are sometimes also adversely affected. Other types of radio communication systems have similarly been operated at levels approaching their maximum capacities.

To avoid capacity problems and to permit an increase in the number of users permitted to utilize a cellular communication system, attempts have been made to increase the communication capabilities of such systems. To increase the communication capacities, some conventional, cellular communication systems using conventional, analog technologies have been converted to digital, cellular communication systems which utilize digital coding and modulation technologies. Similarly, other types of communication systems have been converted, or otherwise constructed, to form digital communication systems.

Because digital communication systems generally utilize the radio frequency transmission channels upon which the communication signals are transmitted more efficiently, increased numbers of communication signals can be transmitted upon the radio frequency channels allocated for such communication systems.

By digitizing an information signal, which is modulated to form a communication signal, signal redundancies can be removed out of the information signal without affecting the amount of information transmitted in a communication signal formed therefrom. Also, once an information signal is digitized, a communication signal formed therefrom can be transmitted in discrete, discontinuous bursts. Both of two or more communication signals can thereby be multiplexed together and transmitted sequentially upon a single frequency channel.

Time-division-multiple-access (TDMA) communication systems utilize such multiplexing of bursts of digitized signals, thereby to utilize more efficiently the frequency band allocated for use by a particular communication system. A standardized, cellular communication system, the Global System for Mobile communication (GSM) system is a TDMA, cellular communication system, and is exemplary of a TDMA communication system.

Other radio communication systems have similarly been developed which utilize the inherent advantages of radio communications. For instance, the above-mentioned co-pending patent application, Ser. No. 08/540,326, discloses a microcellular communication system. Such a microcellular communication system can further advantageously also form a TDMA communication system.

Existing TDMA communication systems generally define a plurality of channels upon a carrier defined about a carrier frequency. The channels are formed of time slots into which the carrier is divided. Conventional TDMA communication systems transmit a single communication signal upon a particular channel. While a conventional TDMA communication system permits an increase in the communication capacity of a wireless communication system to which a limited frequency bandwidth is allocated by dividing a carrier frequency into a plurality of channels upon which signals are sequentially transmitted, only one signal is transmitted upon any particular channel. Only by dividing the carrier into increased numbers of time slots, and therefore channels, can the communication capacity upon any particular carrier conventionally be increased.

The communication devices operable in such systems are typically tunable to transmit and to receive signals transmitted upon various carriers of various frequencies. Certain of such carriers are sometimes defined to be "broadcast" carriers upon which control channels are formed. Control signals are transmitted upon the control channels.

For instance, in a GSM, cellular communication system, control channels are used to transmit control signals by base stations to remotely-positioned subscriber units. When initially turned on or when searching for target radio base stations to which to be handed-over, the subscriber units are tuned to the broadcast carriers of such control channels to measure the downlink energy transmitted continuously as on such carriers.

Such use of broadcast carriers to transmit downlink energy continuously require that the energy transmitted on the broadcast carriers be transmitted throughout an entire cell defined by an associated base station. Analogously, in a microcellular system, energy transmitted on a broadcast carrier must be broadcast throughout an entire microcell. Carrier energy must also be transmitted continuously on all channels defined upon the broadcast carrier to permit a subscriber unit tuning to the broadcast carrier to detect at any time signal energy transmitted thereon.

While traffic channels can be defined upon the "broadcast" carrier, traffic signals transmitted upon the traffic channels must be broadcast throughout an entire cell or microcell, as appropriate, to ensure that a subscriber unit, when tuned to the broadcast carrier, detects signal energy. Because of this requirement, the traffic signals transmitted upon traffic channels defined upon broadcast carriers have been transmitted in manners which ensure that the signal energy of such signals are detectable at any location within the cell.

If more than one communication signal could be concurrently transmitted upon a traffic channel defined upon a broadcast carrier, then a significant increase in the communication capacity of the channel would be possible. Such a manner by which to increase the communication capacity of a TDMA traffic channel defined upon a broadcast carrier would permit further increase in the communication capacity of a communication system.

It is in light of this background information related to TDMA communication systems that the significant improvements of the present invention have evolved.

SUMMARY OF THE INVENTION

The present invention advantageously provides a manner by which to increase the communication capacity of a TDMA communication system. Two or more separate signals are concurrently transmitted upon a single TDMA, traffic channel defined as a time slot upon a broadcast carrier. When embodied in a cellular communication system, antenna beam patterns of antennas used to transduce downlink signals are selected such that the antenna beam patterns collectively encompass an entire cell. Thereby, mobile subscriber units positioned anywhere within the cell, when tuned to the broadcast carrier, are able to detect signal energy of a signal transmitted thereon.

In one aspect of the present invention, a TDMA, cellular communication system, such as a GSM cellular system, transmits at least two separate downlink signals concurrently on a single traffic channel defined upon a single time slot into which a broadcast carrier is divided. At least one of the time slots defines a control channel upon which a control signal is transmitted. Separate downlink signals are transmitted concurrently to at least two spatially-separated mobile units positioned within a cell. A plurality of antennas are used to transduce the separate downlink signals. When the locations at which the at least two mobile subscriber units are positioned are determined, the antenna beam patterns of the selected antennas are formed to effectuate the transmission of the appropriate downlink signals to the appropriate ones of the mobile subscriber units. As the positions of the mobile subscriber units change, appropriate alterations of the configurations of the antenna beam patterns are made, thereby to permit continued transmission of the concurrently-transmitted downlink signals. The antenna beam patterns collectively encompass the entire cell. A mobile unit tuning to the broadcast carrier, when positioned at any location within the cell, is able to detect signal energy of either a control signal or one of the concurrently-transmitted downlink signals. If the traffic channels defined upon the broadcast carrier are not being used to transmit downlink signals to particular mobile subscriber units, "dummy" signals are instead transmitted. The "dummy" signals are signals, formed of an unmodulated carrier, for instance, or of a carrier modulated with any information, transmitted at selected signal strength levels. Such any information modulated upon the carrier may include information intended to be transmitted to another mobile subscriber unit. Such dummy, or pseudo-communication signals are transmitted in place of downlink signals to ensure that a mobile unit tuning to the broadcast carrier detects signal energy transmitted thereon. Viz., the dummy signals are transmitted on idle portions of traffic channels.

In another aspect of the present invention, a TDMA, microcellular communication system transmits at least two downlink signals concurrently on a TDMA channel. Antennas are selectively coupled to transduce the separate downlink signals. The antenna beam patterns configured by the selectively-coupled antennas are able to effectuate the transmission of the downlink signals.

In these and other aspects, therefore, circuitry, and an associated method, is disclosed for a communication device operable to transmit communication signals in a time division multiple access communication system defining at least one carrier divided into a plurality of time slots of which at least a selected time slot thereof forms a traffic channel. The circuitry, and associated method, provides for concurrent transmission of a first communication signal to a first remote communication station and at least a second communication signal to a second remote communication station upon the traffic channel formed of the selected time slot. The first and second remote communication stations are spatially-spaced apart from one another and are positioned at any locations within a selected area, allowing the concurrent transmission of the communication signals to the respective remote communication stations. A plurality of antennas are selectively coupled to the communication device to receive the first communication signal and the at least second communication signal therefrom. The plurality of antennas concurrently transduce the first communication signal and the at least second communication signal upon the traffic channel. An antenna pattern former is coupled to receive indications of the locations of the first and second remote communication stations. The antenna pattern former couples the first communication signal to at least a first set of the plurality of antennas in a manner to form a first antenna beam pattern for transmission of the first communication signal pursuant thereto, the first antenna beam pattern encompassing the position at which the first remote communication station is positioned. The antenna pattern former also couples the at least second communication signal to at least a second set of the plurality of antennas in a manner to form a second antenna beam pattern for transmission of the second communication signal pursuant thereto, the second antenna beam pattern encompassing the position at which the second remote downlink station is positioned. The first antenna beam pattern and the at least second antenna beam pattern together encompass the selected area.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 7 illustrates a partial, functional block and partial, schematic diagram of an embodiment of the present invention operable in a microcellular communication system.

DETAILED DESCRIPTION

Figure 1:
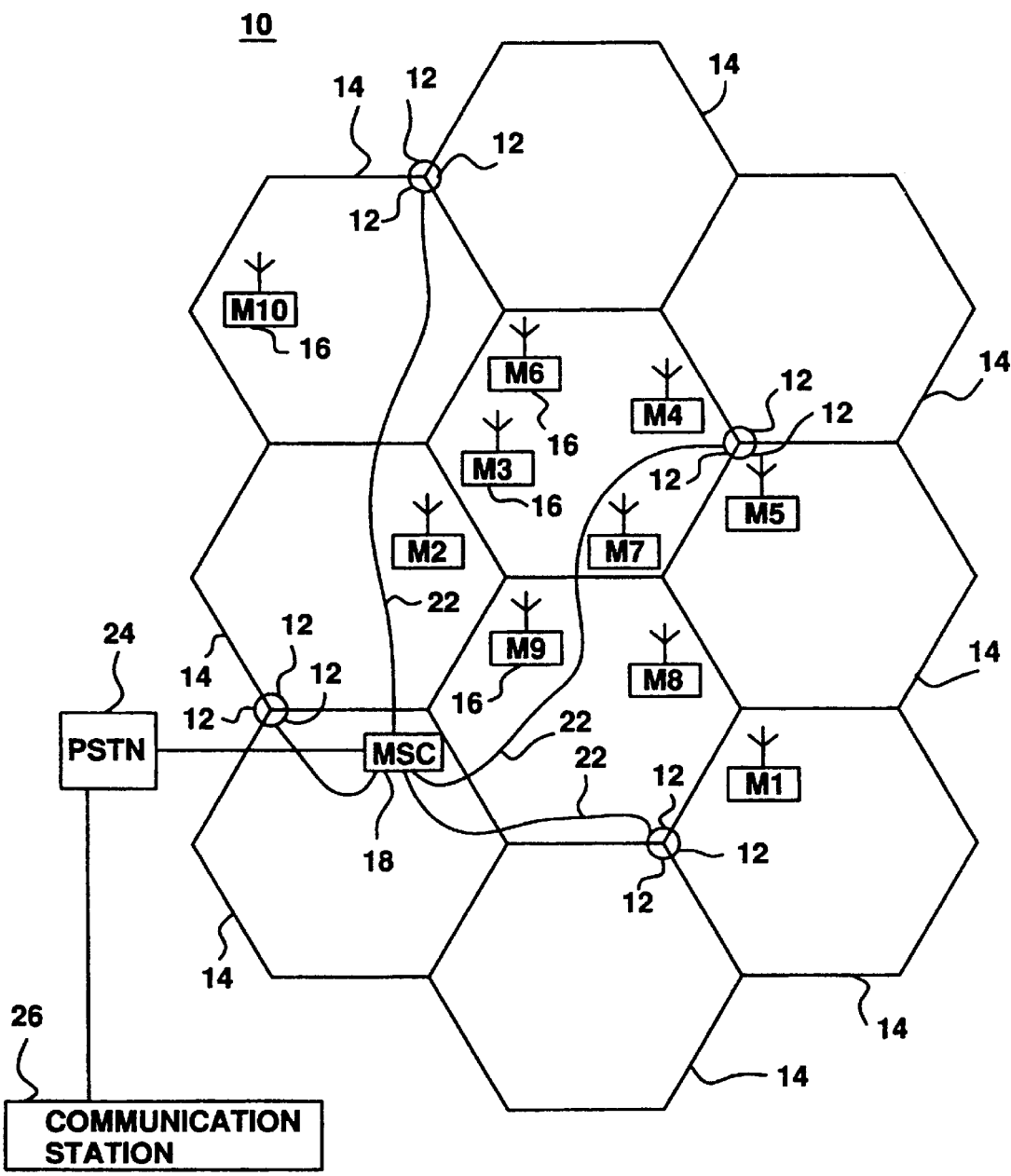
FIG. 1 illustrates a graphical representation of a cellular communication system in which an embodiment of the present invention is operable to increase the communication capacity of the system.

FIG. 1 illustrates a portion of a cellular communication system, shown generally at 10, of which an embodiment of the present invention forms a portion. The portion of the system 10 illustrated in the figure includes a plurality of base stations 12 positioned at spaced-apart locations throughout a geographical area encompassed by the system. Each of the base stations 12 defines a cell 14. In the illustrated embodiment, groups of three base stations 12 are located together, each defining a separate cell 14. The base stations 12 typically include fixed-site transceivers which permit wireless communications to be effectuated with remotely-positioned subscriber units, such as the subscriber units 16 positioned within communication range of the respective ones of the base stations.

Groups of the base stations 12 are coupled to mobile switching centers (MSCs) 18. In the portion of the communication system 10 illustrated in the figure, the base stations 12 are coupled to an MSC by way of lines 22. The MSCs are, in turn, coupled to a public switched telephone network (PSTN) 24. The PSTN 24 is coupled, in conventional manner, to other communication stations, of which a single communication station 26 is illustrated in the figure. The communication station 26 may, for example, be formed of a wireline, telephonic device or any other device capable of transmission and reception of communication signals by way of the PSTN 24.

The base stations 12, the MSC 18, and the couplings 22 therebetween, shall at times below be referred to as the cellular network or infrastructure of the cellular communication system 10.

Once the infrastructure of the cellular communication system has been installed throughout a geographical area and placed into service, two-way communication is permitted between a radio base station 12 and a mobile station 16 when the mobile station is positioned at any location within the geographical area encompassed by the cellular communication system 10. As a subscriber unit 16 travels between cells 14, continued communication is permitted by "handing-off" communications with the subscriber unit from one base station 12 to another.

As mentioned above, significant increases in the utilization of cellular communication systems has necessitated the communication capacities of existing cellular communication systems to be increased. One manner by which the capacity of a cellular communication system is increased is by the utilization of a time-division, multiple-access (TDMA) communication scheme. By utilizing such a scheme, the communication capacity of an existing cellular communication system can be increased several-fold.

Figure 2:
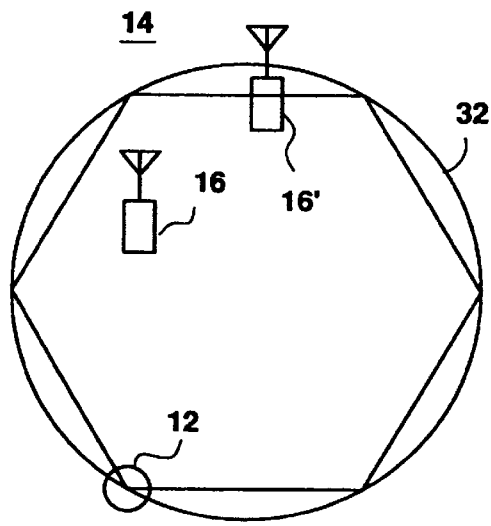
FIG. 2 illustrates a single cell of the cellular communication system shown in FIG. 1, illustrating an antenna beam pattern which substantially encompasses the cell.

FIG. 2 illustrates a single cell 14 of the cellular communication system 10 shown in FIG. 1. As described previously, the cell 14 is formed of a geographical area within which wireless communications between a fixed-site base station 12 and a mobile subscriber unit 16 may be effectuated. In conventional, cellular communication systems, antenna beam patterns formed by antenna circuitry of a base station 12 substantially encompasses the geographical area of a cell 14. The antenna beam pattern 32 shown in FIG. 2 substantially encompasses the cell 14. Downlink signals generated at the radio base station 12 are thereby typically detectable by a mobile subscriber unit 16 positioned at any location in the cell 14. In a cellular communication system, certain carriers, or portions thereof, are defined to be control channels. As downlink control signals must be broadcast throughout the entire cell 14, an antenna beam pattern similar to that of the pattern 32 is formed by antenna apparatus of the radio base station 12 when transmitting the downlink control signals. A subscriber unit, here subscriber unit 16' entering the cell 14, or a subscriber unit turned-on when positioned within the cell, tunes to the carrier to detect signal energy of signals transmitted thereon. Hand-off decisions are made, at least in part, responsive to measured levels of signal energy detected by the subscriber unit 16'.

Figure 3:
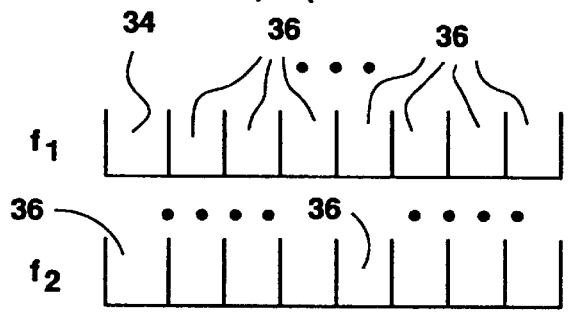
FIG. 3 illustrates channels defined as time slots at selected carrier frequencies, including a broadcast carrier, of an exemplary time division multiple access communication scheme utilized in an embodiment of the present invention.
Figure 3:
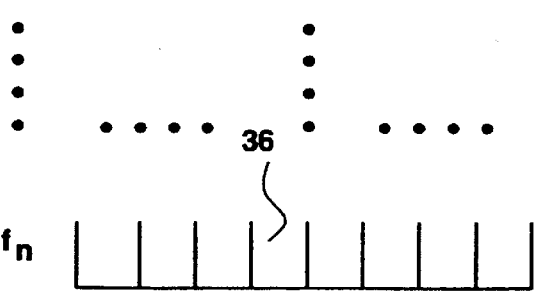

FIG. 3 illustrates the manner by which channels are defined in a TDMA communication scheme. In a TDMA communication scheme, carriers, here carriers $f_1, f_2, \ldots f_n$ are divided into frames. A single frame is shown in the figure for each of the carriers $f_1-f_n$ Successive frames of each carrier may similarly be shown.

Each of the frames is further divided into time slots. Channels, both control channels and traffic channels are defined in the time slots. In the exemplary embodiment illustrated in the figure, the frames are divided into eight time slots, a control channel 34 is defined upon a time slot of the carrier $f_1$, and traffic channels 36 are defined upon remaining ones of the time slots of the frame of the carrier $f_1$. Traffic channels 36 are also defined upon the time slots of the frames of the carriers $f_2-f_n$. The illustrated scheme is exemplary in nature and TDMA communication schemes can analogously be defined in other manners.

A cellular communication system operable pursuant to a TDMA communication scheme generally permits a significant increase in the capacity of communications therethrough relative to a system operable pursuant to a conventional, analog communication scheme.

To further increase the communication capacity of a cellular communication system, proposals have been set forth to transmit concurrently on a single traffic channel more than one communication signal. By utilizing, for example, beam forming techniques, separate antenna beam patterns can be formed to transmit concurrently communication signals between a radio base station 12 and two or more angularly-offset, mobile subscriber units.

Figure 4:
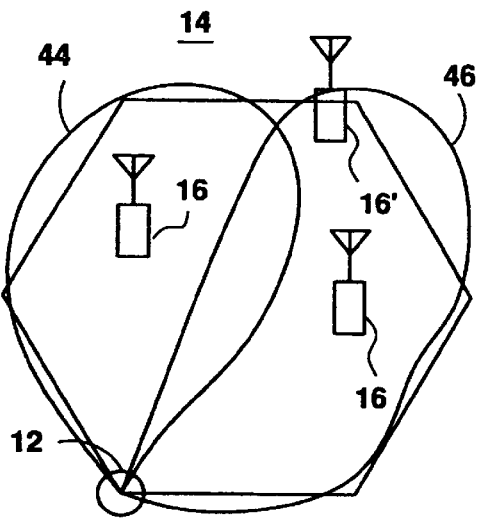
FIG. 4 illustrates a single cell, similar to that shown in FIG. 2, but which illustrates two separate antenna beam patterns which together encompass the cell.

FIG. 4 illustrates a cell 14 in which two mobile subscriber units 16 are positioned. The mobile subscriber units are angularly-offset from one another. By appropriately forming the antenna beam pattern by antenna apparatus of the radio base station 12 which defines the cell, concurrent communications within the single cell upon the same traffic channel 36 is effectuated. By appropriate formation of directional, antenna beam patterns, additional communication can be concurrently effectuated upon a single traffic channel 36 with additional, angularly-offset, mobile subscriber units. The mobile subscriber units 16 are spatially spaced apart from one another by an angular distance at least great enough to permit separate antenna beam patterns, here antenna beam patterns 44 and 46, to be formed to encompass the separate subscriber units.

FIG. 4 also further illustrates a subscriber unit 16' entering the cell 14. When the subscriber unit tunes to the carrier to detect signal energy of signals transmitted thereon, signal energy transduced pursuant to one of the antenna beam patterns 44 and 46 is detectable by the subscriber unit 16'.

Signal energy, however, must be continuously transmitted throughout the entire cell 14 upon certain carriers, here $f_1$ which identify cells to the mobile subscriber units. These carriers are usually the ones having a control channel on one of their time slots. Therefore, concurrent transmission of two or more communication signals upon a traffic channel defined upon a carrier upon which a control channel is also defined must also broadcast signal energy throughout the entire cell at all times. When selecting the antenna beam patterns, particular care must be taken to ensure that the antenna beam patterns together encompass the entire cell 14. By forming the antenna beam patterns such that the patterns together encompass the entire cell 14, signal energy is detectable by a mobile subscriber unit 16 when tuned to such a carrier and positioned at any location in the cell 14.

Figure 5:
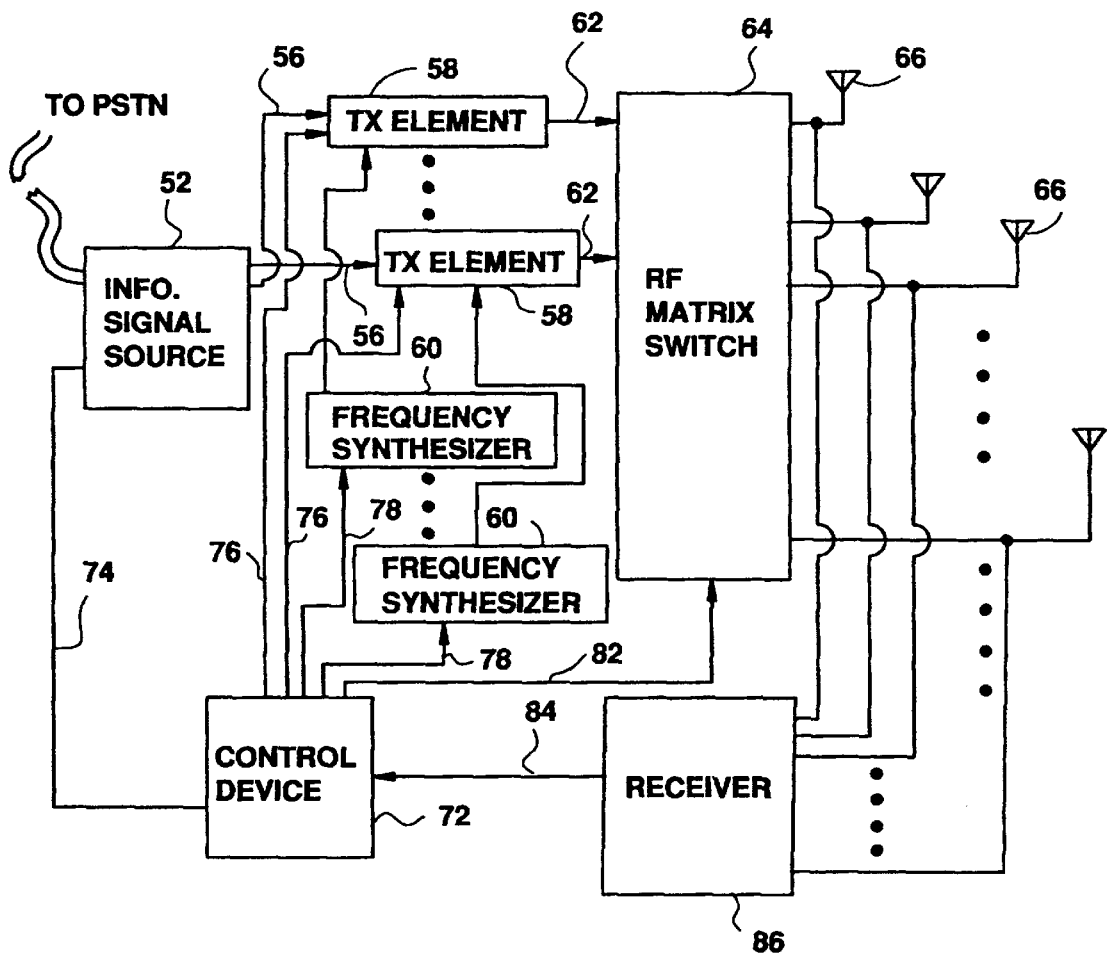
FIG. 5 illustrates a functional block diagram of a radio base station operable pursuant to an embodiment of the present invention.

FIG. 5 illustrates a radio base station 12 of an embodiment of the present invention. The radio base station 12 is operable in a wireless communication system, such as the cellular communication system 10 shown in FIG. 1. The base station 12 is operable pursuant to a TDMA communication scheme. The base station 12 further is operable to effectuate concurrent communication with two or more angularly-separated mobile subscriber units. Through appropriate selection of the configuration of the antenna beam patterns formed to effectuate such communication, traffic channels defined upon a broadcast carrier upon which a control channel is also defined can also be used to communicate concurrently with two or more mobile subscriber units. Thereby, additional increases in the communication capacity of a cellular communication system is provided.

The base station 12 includes an information signal source 52, here shown in block form. The signal source 52 is representative of communication signals transmitted to the base station by way of, for example, a public switched telephone network (PSTN). The signal source 52 forms communication signals which are applied by way of a plurality of lines 56 to a plurality of tunable transmitter elements 58. The transmitter elements 58 are further coupled to receive signals generated by frequency synthesizers 60. The transmitter elements 58 selectively modulate the informational content of the informational signals applied thereto on the lines 56 onto the signals generated by the frequency synthesizers 60. Modulated signals are generated on the lines 62 responsive thereto.

The lines 62 are coupled to first sides of a radio frequency (RF) switch 64. A plurality of antenna elements 66 are coupled to second sides of the RF matrix switch 64. Signals generated on any of the lines 62 can be coupled to any, or any combination of, the antenna elements 66. Phase delays can further be introduced upon the signals applied to selected ones of the antenna elements 66. Through appropriate selection of the amplitudes and phases of the signals applied to the different antenna elements 66, antenna beam patterns are formed of desired configurations.

For instance, and with respect to the antenna beam patterns 44 and 46 shown in FIG. 4, by appropriate selection of the amplitudes and phases of the signals generated on the lines 62 when applied by the RF matrix switch 64 to the antenna elements 66, a first set of antenna elements 66 to which the antenna beam patterns 44 and 46 can be formed, thereby to transmit the separate signals concurrently on a single traffic channel.

A control device 72 is coupled to the information signal source 52 by way of lines 74, to the transmitter elements 58 by way of lines 76, to the frequency synthesizers 60 by way of lines 78, and to the RF matrix switch 64 by way of lines 82. The control device 72 is formed of, for example, processing circuitry having algorithms executable therein, for controlling operation of the various elements to which the device is coupled.

The control device 72 controls, inter alia, the characteristics of the signals generated on the lines 62 and, at least in one embodiment, which of the antenna elements 66 are coupled to receive such signals. For instance, the control device is operable to control whether an information signal generated by the source 52 is modulated upon a carrier signal generated by a frequency synthesizer 60 as well as the time slot and frequency of the carrier generated by such synthesizer 60. And, the control device is operable to effectuate positioning of the RF matrix switch 64 to introduce phase delays, and control signal amplitudes, as appropriate, thereby to form desired antenna beam patterns.

The control device is further coupled by way of lines 84 to receiver circuitry 86. The receiver circuitry is operable to receive uplink signals transmitted to the base station 12 by remotely-positioned mobile subscriber units and detected by the antennas 66. The uplink signals transmitted to the base station 12 include, in one embodiment, information which is used by the control device 72 to determine at least the angular positioning of the subscriber units transmitting such up link signals.

Responsive to such indications, the control device 72 determines antenna beam configurations which should be formed by the antenna elements 66. Antenna beam configurations are formed to permit concurrent communication with more than one remotely-positioned mobile subscriber unit. When the traffic channel is defined upon a carrier upon which a control channel is defined, the antenna beam patterns are selected such that the antenna beam patterns together encompass the entire cell throughout which the base station 12 broadcasts. The requirement that signal energy be continuously transmitted throughout the entire cell upon a carrier upon which a control channel is defined is thereby met. If concurrent communication is not necessitated upon the traffic channel, the antenna beam pattern for communication with a single mobile subscriber unit can be selected to encompass the entire cell. Alternately, a dummy or pseudo-communication signal can instead be transmitted throughout the cell, or appropriate portions thereof.

FIG. 6 again illustrates a single frame defined upon the carrier $f_1$ shown previously in FIG. 3. Here, various combinations of signals and antenna beam configurations formed during operation of the radio base station 12 shown in FIG. 5 are indicated.

Again, the first time slot, T0 is defined to be a control channel 34 upon which a control signal is generated. As mentioned previously, the control signal must be broadcast throughout the entire cell defined by the base station 12. In one embodiment of the present invention, the control device 72 generates the control signal on a selected line 76 to a selected one of the transmitter elements 58.

The control device further causes the frequency synthesizer 60 associated with such transmitter element 58 to generate an oscillating signal at the frequency of the carrier $f_1$. The selected transmitter element modulates the control signal onto the carrier generated by the associated frequency synthesizer 60. A modulated control signal is formed on the line 62 which is applied to the RF matrix switch 64. Additional signals generated by the control device 72 on the lines 82 cause the switch 64 to couple the modulated, control signal at appropriate amplitudes and phase delays to form a selected antenna beam pattern. An antenna beam pattern is selected to ensure that the control signal is broadcast throughout the entire area encompassed by the cell.

The traffic channels defined upon time slots T1 and T2 are representative of "available" traffic channels. Viz., the traffic channels defined upon the time slots T1 and T2 are representative of channels not presently being utilized to communicate telephonic communications with any remote communication stations. During such time slots, control signals generated by the control device 72 on the lines 76 cause the transmitter elements 58 not to modulate information upon the carrier signals generated by the frequency synthesizer 60. Again, signals generated on the lines 78 by the control device are determinative of the frequencies of the carrier signals generated by their respective synthesizers 60. Thereby, the transmitter elements 58 generate unmodulated signals on the lines 62 at the carrier frequency, here $f_1$. Signals generated by the control device on the lines 82 cause the RF matrix switch to couple the signals applied on lines 62 to antenna elements 66 in manners to ensure that the unmodulated signals are transmitted throughout the entire cell. Thereby, mobile subscriber units positioned within the cell and tuned to the carrier $f_1$ detect signal energy during the time slots T1 and T2.

The traffic channel defined upon time slot T3 is representative of a traffic channel upon which two separate communication signals are transmitted by the base station 12 concurrently. Separate information signals generated by the signal source 52 are applied by way of respective lines 56 to their respective transmitter elements 58. Carrier signals generated by the frequency synthesizers 60 are of corresponding frequencies and modulated signals of frequency $f_1$ are generated on the lines 62. Again, signals generated by the control device on the lines 82 cause the RF matrix switch 64 to selectively couple the separate, modulated signals generated on lines 62 to the antenna elements 66 at desired amplitudes and phase delays. Antenna beam patterns are formed to permit concurrent communication with angularly spaced-apart mobile subscriber units in manners similar to those described previously, such as with respect to FIG. 4.

In one embodiment, the control device 72 is further operable to determine the angular positioning of the mobile subscriber units responsive to uplink signals transmitted by the subscriber units and received by the receiver 86.

The traffic channel defined upon time slot T4 is similar to the traffic channels defined upon time slots T1 and T2 and is representative again of an available traffic channel. Here, the control device 72 generates signals on the lines 76, 78, and 82 to cause an unmodulated carrier of frequency $f_1$ to be broadcast throughout an entire cell. The RF matrix switch 64 permits formation of an antenna beam pattern which broadcasts the unmodulated carrier throughout the entire cell. Again, a mobile subscriber unit tuning to the carrier $f_1$ detects signal energy of the ummodulated carrier. In another embodiment, other-than-information signals or non-meaningful information signals are modulated upon the carrier and broadcast throughout the entire cell.

The traffic channel defined upon time slot T5 is representative of use of the traffic channel to transmit a single downlink signal to a single mobile subscriber unit. Again, the control device 72 is operable to generate signals on the lines 76, 78, and 82 to cause a selected transmitter element 58 to modulate information signals applied thereto upon a carrier generated by a frequency synthesizer 60 associated with the selected transmitter element. A modulated signal is generated on the line 62, and the RF switch 64 is positioned to couple the modulated signal to the antenna elements 66 in such manners such that an antenna beam pattern is formed which encompasses the entire cell. Telephonic communication is thereby effectuated with the mobile subscriber unit. Other mobile subscriber units tuning to the carrier $f_1$ are again able to detect signal energy of the downlink signal when positioned at any location within the cell.

The traffic channel defined upon time slot T6 is also representative of use of the traffic channel to transmit a downlink signal to a single mobile subscriber unit. Here, the RF matrix switch 64 applies phase delays and alters the amplitudes of a signal applied thereto on a line 62 to form two separate antenna lobes, in which a modulated signal is transmitted by way of a single-lobe of the antenna beam pattern which encompasses the location at which the subscriber unit to which the information is to be directed is located. The modulated signal is further transduced pursuant to the other lobe. Again, a mobile subscriber unit tuning to the carrier $f_1$ detects signal energy, either the signal energy of a downlink signal transduced pursuant to the first antenna lobe or the signal energy of a downlink signal transduced pursuant to the other antenna lobe, depending upon the position of the subscriber unit in the cell.

The traffic channel defined upon time slot T7 is analogous to the exemplary use of the traffic channel defined upon time slot T6. Again, two separate antenna lobes are formed. A modulated signal is transmitted to a mobile subscriber unit positioned within the cell. The modulated signal is transmitted by way of a single-lobe of the antenna beam pattern, the lobe encompassing the position at which the subscriber unit is positioned. An unmodulated carrier is transmitted by way of the other antenna lobe. Again, another mobile subscriber unit tuning to the carrier $f_1$ is able to detect signal energy when positioned at any location within the cell.

Figure 6:
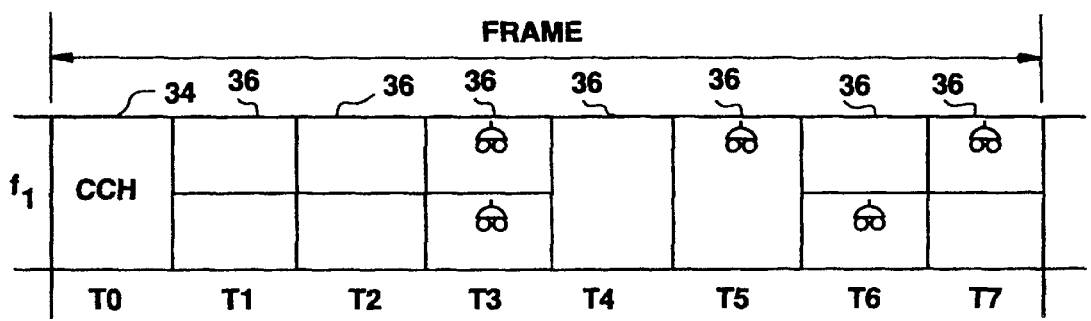
FIG. 6 illustrates the channels defined as time slots upon a single carrier frequency of the frequencies shown in FIG. 3, and transducing various antenna beam patterns and various downlink signals generated during operation of an embodiment of the present invention.

Examination of FIG. 6 indicates that, although the carrier $f_1$ forms a broadcast carrier due to the generation of the control signal upon the control channel defined upon time slot T0, more than one communication signal can be concurrently transmitted upon a traffic channel defined upon the broadcast carrier. Thereby increasing the capacity of communications on the broadcast carrier is provided. Signal energy is detectable by a mobile subscriber unit tuning to the carrier $f_1$ during any of the time slots. Thereby, the requirements that signal energy be broadcast continuously throughout the entire cell upon the broadcast carrier is also met.

FIG. 7 illustrates a microcellular communication system, shown generally at 150, similar to that disclosed in the aforementioned application, Ser. No. 08/540,326. The system 150 provides for wireless communication within a defined area, here a building structure 152, forming a microcellular area. As described more fully in the aforementioned application, a plurality of distributed antennas formed of remote antenna devices (RADs) 154 are spaced apart throughout the building structure 152. Each of the RADs 154 forms a transceiver device permitting communication with a mobile subscriber unit 156 within a subcell 158 defined about respective ones of the RADs.

The RADs 154 are coupled to a radio base station 162 which includes processing and control unit. Such structure is sometimes also referred to as a hub. The base station 162 includes circuitry analogous to circuitry of the base station 12 shown in FIG. 5. The base station 162 is coupled to an external network, such as a public switched telephone network (PSTN). The hub 162 is operative to control operation of the microcellular system. For instance, the hub 162 selects which of the RADs 154 is turned-on, thereby to permit communication with a mobile subscriber unit 156.

As also disclosed in the aforementioned patent application, in one embodiment, two adjacent RADs 154 are used to transmit the same downlink signal at the same time. That is to say, downlink signals are transmitted concurrently by two adjacent RADs 154, to ensure that continued communications are permitted as a mobile subscriber unit 156 travels out of one subcell 158 and into an adjacent subcell. The pairs of adjacent subcells throughout which downlink communication signals are concurrently transmitted define microcell portions of the microcellular area.

A downlink control signal is transmitted throughout the entire area encompassed by the microcellular system 150, from each of the RADs 154.

The microcellular communication system 150 is implemented utilizing a TDMA communication scheme, analogous to that above-described with respect to the macrocellular communication system 10. Again, there is a requirement that signal energy at all times be transmitted upon the carrier upon which the control channel is defined, such carrier forming a broadcast carrier. A subscriber unit 156 detects signal energy when tuned to the frequency of the broadcast carrier.

In the system 150, traffic channels are also defined upon the carrier upon which the control channel is defined. The hub 162 is operable to assign traffic signals upon selected traffic channels defined upon the carrier, thereby to increase the communication capacity of the system 150. During a time slot upon which a single traffic channel is defined, two or more separate downlink communication signals can be transmitted to two or more subscriber units 156 positioned in different subcells, or different subcell pairs in an embodiment in which downlink energy is also transmitted concurrently throughout remaining subcells, thereby ensuring that a subscriber unit positioned in any subcell detects signal energy when tuning to the carrier frequency associated with the two or more separate downlink communication signals.

When traffic channels defined upon the broadcast carrier are not being utilized to communicate with particular mobile subscriber units, an unmodulated carrier or the carrier modulated with another selected signal is transduced throughout all of the subcells. Thereby, a mobile subscriber unit positioned in any subcell tuning to the broadcast carrier is able to detect signal energy during every time slot into which the broadcast carrier is divided.

Because operation of an embodiment of the present invention permits an increase in the communication capacity of a TDMA communication system, increased numbers of communications pursuant to an existing communication system can be effectuated.

The previous descriptions are of preferred samples for implementing the invention, and the scope of the invention should not necessarily be limited by this description. The scope of the present invention is defined by the following claims.

What is claimed is:

1. In a communication device operable to transmit communication signals in a time-division multiple access communication system defining at least one carrier frequency divided into a plurality of time slots of which at least a selected time slot thereof forms a traffic channel, the carrier frequency permitting tuning of a selected remote communication station thereto to detect signal energy thereon, an improvement of circuitry for concurrently transmitting a first communication signal to a first remote communication station and at least a second communication signal to at least a second remote communication station upon the traffic channel formed of the selected time slot, the first and at least second remote communication stations spatially spaced apart from one another and positioned at any location within a selected area, said circuitry comprising:

a plurality of antennas selectively coupled to the communication device to receive the first communication signal and the at least second communication signal therefrom, said plurality of antennas for concurrently transducing the first communication signal and the at least second communication signal upon the traffic channel; and an antenna pattern former coupled to receive indications of positioning, from the communication device, of the first and second remote communication stations, respectively, said antenna pattern former for selectively coupling the first communication signal to at least a first set of said plurality of antennas in a manner to form a first antenna beam pattern for transmission of the first communication signal pursuant thereto, the first antenna beam pattern encompassing the positioning of the first remote communication station and for selectively coupling the at least second communication signal to at least a second set of said plurality of antennas in a manner to form at least a second antenna beam pattern for transmission of the second communication signal pursuant thereto, the second antenna beam pattern encompassing the positioning of the second remote communication station, the first antenna beam pattern and the at least second antenna beam pattern together encompassing the selected area such that, when positioned within the selected area and tuned to the carrier frequency, the selected remote communication station detects the signal energy of at least one of the first and second communication signals, respectively.

2. The circuitry of claim 1 wherein the plurality of time slots into which the carrier frequency is divided further comprises a control channel, wherein the communication device is further operable to transmit a control signal upon the control channel, said antenna pattern former further operable to couple the control signal to a third set of said plurality of antennas in a manner to form a third antenna beam pattern encompassing the selected area, thereby to permit transmission of the control signal throughout the selected area.

3. The circuitry of claim 2 wherein the signal energy is substantially continuously transmitted upon the carrier frequency, the signal energy alternately of at least the control signal and the first and at least second communication signal, the signal energy transmitted throughout the selected area.

4. The circuitry of claim 2 further comprising a pseudo-communication signal generator, said pseudo-communication signal generator for generating a pseudo-communication signal, said plurality of antennas further selectively coupled to said pseudo-communication signal generator, and said antenna pattern former further for selectively coupling the pseudo-communication signal to a fourth set of said plurality of antennas in a manner to form a fourth antenna beam pattern.

5. The circuitry of claim 4 wherein the signal energy is substantially continuously transmitted upon the carrier frequency, the signal energy alternately of at least the control signal, the pseudo-communication signal, and the first and at least second communication signal, the signal energy transmitted throughout the selected area.

6. The circuitry of claim 5 wherein said antenna pattern former is further operable selectively to couple the first communication signal to the at least first set of the plurality of antennas in the manner to format the first antenna beam pattern and selectively to couple the pseudo-communication signal to the fourth set of said plurality of antennas in the manner to form the fourth antenna beam pattern, the first antenna beam pattern and the fourth antenna beam pattern together encompassing the selected area.

7. The circuitry of claim 5 wherein, when said antenna pattern former only couples the first communication signal to the first set of said plurality of antennas and the first set of antennas is selected such the first antenna beam pattern encompasses the selected area.

8. The circuitry of claim 5 wherein the fourth antenna beam pattern comprises a first lobe and a second lobe, the first lobe and the second lobe together encompassing the selected area.

9. The circuitry of claim 5 wherein, when said antenna pattern former only couples the first communication signal to the first set of said plurality of antennas, the first antenna beam pattern comprises a first lobe and a second lobe, the first lobe and the second lobe together encompassing the selected area.

10. The circuitry of claim 5 wherein the pseudo-communication signal generated by said pseudo-communication signal generator comprises an unmodulated carrier signal.

11. The circuitry of claim 5 wherein the pseudo-communication signal generated by said pseudo-communication signal generator comprises a carrier signal modulated by other-than-telephony data information.

12. The circuitry of claim 1 wherein the communication system comprises a radiotelephonic communication system, the communication device comprises a fixed-site transceiver, the selected area defines a cell, and the at least one carrier frequency comprises a broadcast carrier to which the first remote communication station and the second remote communication stations are tuned during operation thereof, and wherein the first antenna beam pattern and the at least second antenna beam pattern formed by said antenna pattern former together encompass the cell.

13. The circuitry of claim 1 wherein said plurality of antennas comprise an adaptive array of antennas, the antennas of said adaptive array of antennas selectively coupled at selected times to receive the first communication signal and the at least second communication signal.

14. The circuitry of claim 13 wherein the first and at least second communication signals are applied to said plurality of antennas at selected phase delays and selected amplitude offsets in manners to form the first antenna beam pattern for transmission of the first communication signal pursuant thereto and for transmission of the at least second antenna beam pattern to transmit the at least second communication signal pursuant thereto.

15. The circuitry of claim 1 wherein said plurality of antennas comprise distributed antennas, wherein the first set of antennas comprises at least a first distributed antenna coupled to receive the first communication signal and to exhibit the first antenna beam pattern encompassing the first remote communication station, and at least a second distributed antenna coupled to receive the at least second communication signal and to exhibit the at least second antenna beam pattern encompassing the second remote communication station.

16. The circuitry of claim 1 wherein the communication system comprises a radiotelephonic communication system, the communication device comprises a fixed-site radio transceiver, and the selected area at any location of which the first and second remote communication stations are positioned comprises a cell associated with the fixed-site radio transceiver, and wherein the antennas of said plurality of antennas each define a microcellular area of the cell, the first and second remote communication stations spaced apart from one another to be positioned in two different microcellular areas.

17. The circuitry of claim 1 wherein the communication system comprises a radiotelephonic communication system, the communication device comprises a fixed-site radio transceiver, and the selected area at any location of which the first and second remote communication stations are positioned comprises a cell associated with the fixed-site radio transceiver, and wherein said plurality of antennas comprise an adaptive antenna array, the adaptive antenna array concurrently coupled to receive the first and at least second communication signals, respectively, and for forming the first antenna beam pattern and the at least second antenna beam pattern pursuant to which the first communication signal and the at least second communication signal, respectively, are concurrently transmitted, the first antenna beam pattern and the at least second antenna beam pattern together encompassing the selected area.

18. The circuitry of claim 1 further comprising a determiner for determining the positioning, at least relative to the communication device, of the first remote communication station and of the second remote communication station, said antenna pattern former coupled to receive the indications of the positioning determined by said determiner of the first and second communication stations.

19. The circuitry of claim 18 wherein the first communication signal comprises a first downlink signal, wherein the at least second communication signal comprises a second downlink signal, and wherein the communication device further comprises receiver circuitry for receiving uplink signals generated by the at least first and second remote communication stations, and wherein said determiner determines the positioning of the first and second remote communication stations, respectively, responsive to characteristics of the uplink signals received by the receiver circuitry.

20. The circuitry of claim 19 wherein the characteristics of the uplink signals utilized by said determiner comprise signal strengths of the uplink signals.

21. The circuitry of claim 20 wherein the characteristics of the uplink signals utilized by said determiner further comprise phases of the uplink signals.

22. The circuitry of claim 19 wherein the characteristics of the uplink signals utilized by said determiner comprise signal quality levels of the uplink signals.

23. The circuitry of claim 19 wherein the positioning of the first remote communication station and of the second remote communication station determined by said determiner comprise angular positions of the first and second communication stations, respectively, relative to the communication device.

24. The circuitry of claim 19 wherein said determiner comprises a processing device having algorithms executable therein for determining the positioning of the at least first remote communication station and the second remote communication station.

25. In a method for communicating downlink signals formed at a communication device in a time-division-multiple access communication system defining at least one carrier divided into a plurality of time slots of which at least a selected time slot thereof forms a traffic channel, an improvement of a method for concurrently transmitting at least a first communication signal to a first remote communication station and a second communication signal to a second remote communication station upon the traffic channel, the first and second remote stations spatially spaced apart from one another and positioned at any location within a selected area, said method comprising the steps of:

determining locations of the first remote communication station and of the second remote communication station;

selectively coupling at least a first set of antennas to transduce the first communication signal responsive to the locations determined during said step of determining, thereby to form a first antenna beam pattern encompassing the first remote communication station;

selectively coupling at least a second set of antennas to transduce the second communication signal responsive to the locations determined during said step of determining, thereby to form a second antenna beam pattern encompassing the second remote communication station, the first antenna beam pattern and the second antenna beam pattern together encompass the selected area; and concurrently transducing the first communication signal at the first set of antennas and the second communication signal at the second set of antennas, thereby to concurrently transmit the first communication signal to the first remote communication station and the second communication signal to the second remote communication station.

26. The method of claim 25 wherein the first set of antennas and the second set of antennas which form the first antenna beam pattern and the second antenna beam pattern during the steps of selectively coupling include at least one antenna common to both the first and second sets, respectively, of antennas.

27. The method of claim 25 wherein the first set of antennas and the second set of antennas which form the first antenna beam pattern and the second antenna beam pattern during the steps of selectively coupling comprise mutually exclusive sets.

28. A method for concurrently transmitting from a communication device at least a first downlink signal to a first remote communication station and a second downlink signal to a second remote communication station upon a traffic channel defined pursuant to a time division-multiple access communication scheme upon a carrier, the first and second remote stations, respectively, spatially spaced apart from one another and positioned at any location within a selected area, said method comprising the steps of:

selectively coupling at least a first set of antennas to receive the first downlink signal responsive to indications from the communication device of positioning of the first remote communication station, thereby to form a first antenna beam pattern encompassing the first remote communication station;

selectively coupling at least a second set of antennas to receive the second downlink signal responsive to indications from the communication device of positioning of the second remote communication station, thereby to form a second antenna beam pattern encompassing the second remote communication station, the first antenna beam pattern and the second antenna beam pattern together encompassing the selected area; and concurrently transducing the first downlink signal at the first set of antennas and the second downlink signal at the second set of antennas, thereby to concurrently transmit the first downlink signal to the first remote communication station and the second downlink signal to the second remote communication station.

29. Apparatus for a radio base station operable to transmit a first downlink signal to a first subscriber unit and at least a second downlink signal to at least a second subscriber unit pursuant to a time division multiple access scheme defined upon at least one broadcast carrier, the at least one broadcast carrier divided into at least one control channel and at least one traffic channel, the second subscriber unit angularly offset from the first subscriber unit and the first and second subscriber units, respectively, positioned within a cell, said apparatus comprising:

a plurality of antennas selectively coupled to receive a control signal, the first downlink signal and the at least second downlink signal, said plurality of antennas for concurrently transducing the first downlink signal and the at least second downlink signal upon the traffic channel and for transducing the control signal upon the control channel;

an antenna pattern former coupled to receive at least indications of angular positioning of the first and second subscriber units, said antenna pattern former for coupling the first downlink signal to at least a first set of said plurality of antennas in a manner to form a first antenna beam pattern for transmission of the first downlink signal pursuant thereto, the first antenna beam pattern encompassing an angular position at which the first subscriber unit is indicated to be located, for coupling the at least second downlink signal to at least a second set of said plurality of antennas in a manner to form at least a second antenna beam pattern for transmission of the second downlink signal pursuant thereto, the second antenna beam pattern encompassing an angular position at which the second subscriber unit is indicated to be located, the first antenna beam pattern and the at least second antenna beam pattern together encompassing the cell, and for coupling the control signal to a third set of said plurality of antennas in a manner to form a third antenna beam pattern, the third antenna beam pattern encompassing the cell, for transmission of the control signal throughout the cell.

30. Apparatus for a radio base station operable in a microcellular area in a microcellular communication system to transmit continuously on a selected broadcast carrier frequency downlink signal energy including a first downlink signal to a first subscriber unit and at least a second downlink signal to at least a second subscriber unit, the first and at least second downlink signals, respectively, transmitted pursuant to a time division multiple access scheme defined upon at least said selected broadcast carrier frequency, the broadcast carrier frequency divided into time slots defining at least one control channel and at least one traffic channel, the microcellular area formed of at least a first microcell portion and a second microcell portion, the first microcell portion and the second microcell portion each having at least two subcells, the first and second subscriber units positioned in subcells of dissimilar microcell portions, said apparatus comprising:

a plurality of spaced-apart antennas, an antenna of said plurality associated with each of the subcells of the first and second microcell portions of the microcellular area; and an antenna pattern former coupled to receive at least indications of positioning of the first and second subscriber units, said antenna pattern former for coupling, during a time slot defining the at least one traffic channel, the first downlink signal to at least a first antenna of said plurality, the first antenna associated with the subcell in which the first subscriber unit is indicated to be positioned for coupling, also during the time slot defining the at least one traffic channel, the second downlink signal to at least a second antenna of said plurality, the second antenna associated with the subcell in which the second subscriber unit is indicated to be positioned, for coupling remaining antennas, if any, also during the time slot defining the at least one traffic channel, to at least signal energy, such that at least signal energy is transmitted throughout every subcell of the microcellular area during the time slot defining the at least one traffic channel, and for coupling the control signal to all of the antennas of said plurality during a time slot defining the control channel.

\* \* \* \* \*

UNITED STATES PATENT AND TRADEMARK OFFICE
CERTIFICATE OF CORRECTION

PATENT NO. : 5,838,674
DATED : November 17, 1998
INVENTOR(S) : Forssén et al.

It is certified that error appears in the above-identified patent and that said Letters Patent is hereby corrected as shown below:

Title page,
Item [73], Assignee, after "Ericsson" insert -- (publ) --
Attorney, Agent, or Firm, replace "Jenkins" with -- Jenkens --

Column 13,
Line 23, replace "signal" with -- signals --

Column 13,
Line 38, replace "signal" with -- signals --

Signed and Sealed this

Twenty-third Day of October, 2001

Attest:

*Attesting Officer*

NICHOLAS P. GODICI
*Acting Director of the United States Patent and Trademark Office*